Patented Dec. 13, 1927.

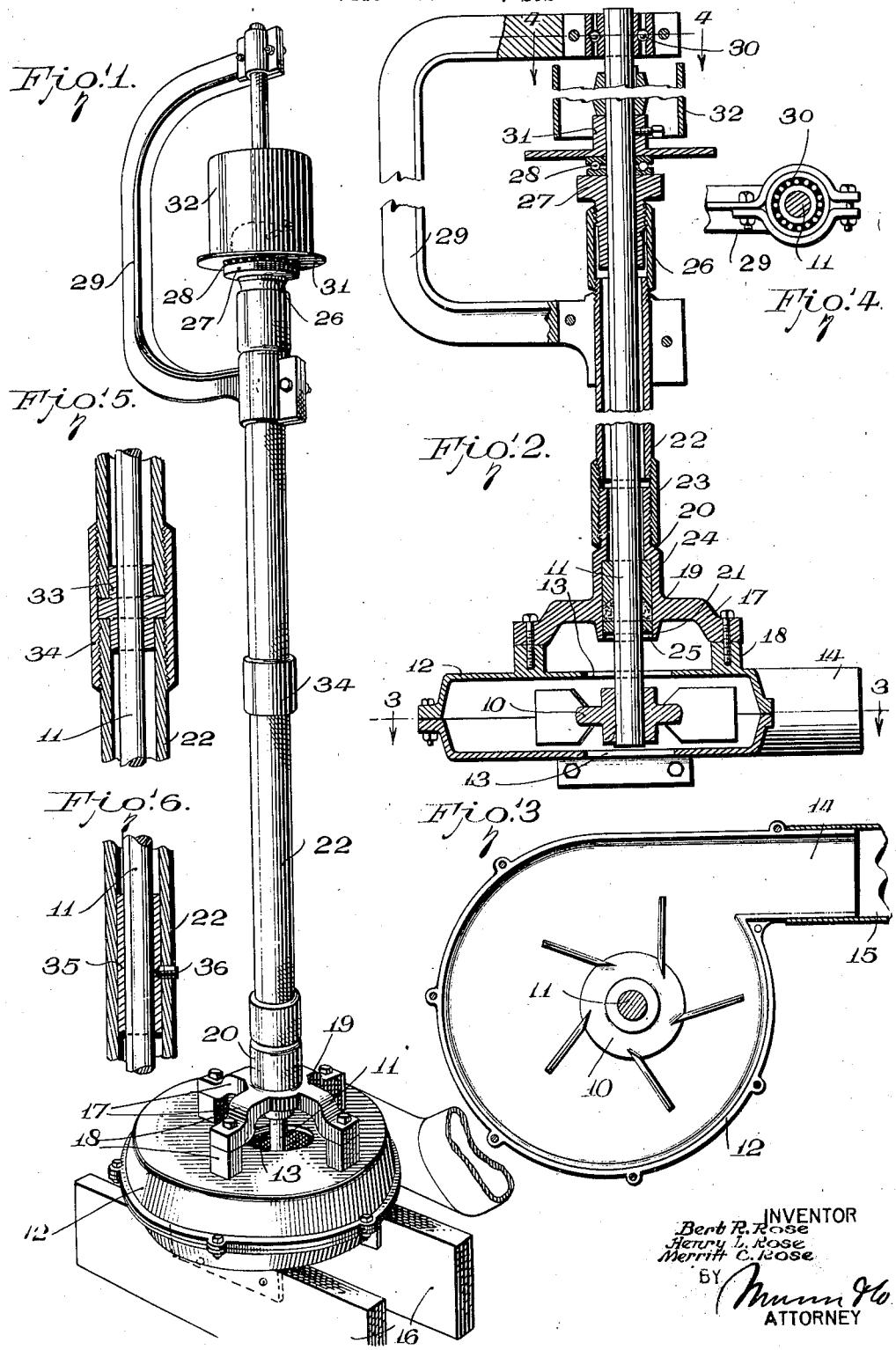

1,652,877

UNITED STATES PATENT OFFICE.

BERT R. ROSE, HENRY L. ROSE, AND MERRITT C. ROSE, OF PARMA, IDAHO.

WATER-LIFTING DEVICE.

Application filed March 26, 1927. Serial No. 178,687.

Our present invention relates generally to water lifting devices and more particularly to water lifting devices of the type described and claimed in Patent Number 1,100,491 granted to Lucius G. Rose under date of June 16, 1914, our primary object being the improvement and refinement of such apparatus so as to adapt the same to a wider range of usefulness including substantially deeper operations.

According to our invention, we propose to eliminate the shaft supporting frame of the above patent and support the shaft by an upright tube in connection with which the shaft is so mounted as to permit of adjustment of the impeller in its casing from the upper end of the shaft as well as to create several bearings whose presence avoids whipping of the shaft, and provide for the constant lubrication of these bearings.

In the accompanying drawing, which illustrates our present invention and forms a part of this specification, Figure 1, is a perspective view of our improved water lifting device, Figure 2, is a vertical sectional view taken therethrough, Figure 3, is a horizontal sectional view taken substantially on line 3—3 of Figure 2, Figure 4, is a similar view taken on line 4—4 of Figure 2, and Figures 5 and 6 are detail longitudinal sectional views taken through certain portions of the shaft housing and showing alternate internal bearing arrangements.

Referring now to this drawing, our improved water lifting device comprises a rotary bladed impeller 10 mounted rigidly upon the lower end of a shaft 11 within a two part casing 12 whose upper and lower parts are bolted together and have centrally located upper and lower inlet openings 13, the former being around the lower portion of the shaft 11. The casing 12 also has a side outlet 14 and to this outlet a suitable discharge pipe 15 of flexible or rigid nature is coupled in use. The impeller casing 12 is, in use, submerged within the water to be lifted and is preferably mounted upon skids 16 so as to elevate substantially above the bottom of the body of water in which it is used.

Above the casing 12, and secured at the outer ends of its radial arms 17 upon bosses 18 of said casing, is a spider frame 19 having a centrally upstanding tubular portion 20 and a lower counter-bored boss 21 alined with tube 20. The shaft 10 upstands through the boss 21 and tube 20 and also through a tubular casing 22, the lower end of the latter of which is connected by a threaded coupling 23. In the counter-bore of the boss 21 packing 24 of suitable character snugly surrounds the shaft 11 and is held in place by a driven cap 25.

The upper end of the tubular casing 22, below the upper end of shaft 11, is closed by a tubular adjusting nut 26 threaded therein and which surrounds the shaft and has an upper flanged head 27 forming a support for a thrust bearing 28 preferably of anti-friction type. To the upper portion of the casing 22 the lower end of a U-shaped bracket 29 is securely clamped and the upper end of this bracket carries an anti-friction bearing 30 for the upper end of the shaft 11 at a point substantially above the upper end of the casing 22.

Above the bearing 28, a flanged collar 31 is secured to the shaft 11, the flange of this collar resting on the said bearing so as to thus support the weight and downward thrust of the shaft 11 and impeller 10 and permit of adjustment of the latter so as to clear and center the same vertically in the casing 11 by adjusting the nut 26 at the upper end of the casing 22. A belt-driven wheel 32 is keyed or otherwise fixed to shaft 11 above the flanged collar 31 and upon that portion of the shaft which is braced and strengthened by the bracket 29.

The length of the casing 22 is of course dependent upon the length of the shaft desired for any particular use, but where these parts are employed of a length likely to permit whipping of the shaft in the casing, we propose internal bearings of any suitable character such for instance as shown in Figures 5 and 6. In Figure 5 a bearing 33 is shown around the shaft within the casing, having an annular rib portion engaged between the ends of adjacent casing sections connected by a threaded coupling 34. In Figure 6 the tubular bearing 35 interfits the casing 22 around the shaft and is held in place by a set screw 36 through the casing. It is obvious, however, that other internal bearings may be employed and that all such will be lubricated thoroughly since, in use, the casing 22 forms therein an oil reservoir, the oil being held against escape by means of the lower packing 24 which also acts to prevent grit and dirt from finding its way upwardly into the casing to the bearings.

Our improved water lifting device as thus constructed, can be used in operation by substantial depth and will be strong, durable and effective.

We claim:—

1. A water lifting device including a lower casing having inlets and an outlet, a rotary impeller therein, an upright shaft upon the lower end of which said impeller is secured, a tubular casing housing said shaft above the casing, means on the upper portion of the shaft whereby it may be driven, a nut threaded in and closing the upper end of said casing, a flanged collar secured on the shaft above said nut, and an anti-friction bearing between said nut and said collar.

2. In a pump, a pump casing having an inlet and an outlet, a cylindrical casing extending vertically therefrom, a bracket supported from the upper end of the cylindrical casing and provided with a bearing in vertical alinement with the latter, a head received in the upper end of the cylindrical casing, a shaft passing through the cylindrical casing with one end disposed in the pump casing and its opposite end journalled in the bearing, a vertically adjustable collar on the shaft, anti-friction means between the collar and head, and an impeller fixed to the shaft and revoluble in the pump casing, the head and collar being adjustable to raise or lower the impeller whereby to centralize the latter in the pump casing.

3. In a pump, a pump casing having inlet and outlet ports, a cylindrical casing extending vertically from the pump casing, a U-shaped bracket arranged with its parallel legs horizontal with one of them attached to the upper end of the cylindrical casing, a bearing carried by the other parallel leg and located in vertical alinement with the cylindrical casing, a head vertically adjustable in the upper end of the cylindrical casing and having a longitudinal bore, a rotary shaft passing longitudinally through the cylindrical casing and head with its upper end received in the bearing and its lower end projecting into the pump casing, an impeller fixed to the lower end of the shaft, and an adjustable collar fixed to the shaft and resting upon the head whereby to support the weight of the shaft and impeller, the head and collar being adjustable vertically to position the impeller with relation to the upper and lower walls of the pump casing.

BERT R. ROSE.
HENRY L. ROSE.
MERRITT C. ROSE.